(12) United States Patent
Nagatani et al.

(10) Patent No.: US 7,700,230 B2
(45) Date of Patent: Apr. 20, 2010

(54) GENERALLY OVAL BATTERY

(75) Inventors: Masatomo Nagatani, Osaka (JP); Tatsuya Hashimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/595,970

(22) PCT Filed: Feb. 16, 2005

(86) PCT No.: PCT/JP2005/002330
§ 371 (c)(1),
(2), (4) Date: May 23, 2006

(87) PCT Pub. No.: WO2005/078824
PCT Pub. Date: Aug. 25, 2005

(65) Prior Publication Data
US 2007/0243462 A1  Oct. 18, 2007

(30) Foreign Application Priority Data
Feb. 17, 2004  (JP)  ............... 2004-039429

(51) Int. Cl.
*H01M 2/08* (2006.01)
(52) U.S. Cl. ............. 429/185; 429/163; 429/164
(58) Field of Classification Search .......... 429/185, 429/163, 164
See application file for complete search history.

(56) References Cited

U.S. PATENT DOCUMENTS

| 2001/0006746 | A1* | 7/2001 | Kageyama ............ 429/56 |
| 2003/0157404 | A1* | 8/2003 | Inoue et al. ............ 429/175 |
| 2005/0118501 | A1  | 6/2005 | Hashimoto et al. |
| 2005/0153194 | A1  | 7/2005 | Kimura et al. |

FOREIGN PATENT DOCUMENTS

| JP | 2653833 | 5/1997 |
| JP | 2001-043845 | 2/2001 |
| JP | 2001-126677 | 5/2001 |
| JP | 2001155698 A * | 6/2001 |

OTHER PUBLICATIONS

English Language Abstract of JP 2653833.
English Language Abstract of JP 2001-126677.
English Language Abstract of JP 2001-043845.

\* cited by examiner

*Primary Examiner*—Jane Rhee
(74) *Attorney, Agent, or Firm*—Greenblum & Bernstein P.L.C.

(57) ABSTRACT

A generally oval battery including a battery case (2) having a generally oval cross section, a generally oval sealing plate (3) and an electrode plate assembly, the sealing plate (3) having a U-shaped cross section and the battery having a thickness of 4 mm or more and an aspect ratio of 3 or more, whereby the control of a vent for discharging gas that is generated in the battery is made easy and a battery is provided which has a discharge mechanism capable of discharging gas easily and safely, without requiring expensive equipment or many processing steps.

4 Claims, 7 Drawing Sheets

GENERALLY OVAL BATTERY

TECHNICAL FIELD

The present invention relates to a gas discharge mechanism of a battery.

BACKGROUND ART

Conventional prismatic batteries have a battery case, and inside this battery case, an electrode plate assembly made up of positive and negative electrodes and a separator is accommodated, and liquid electrolyte is filled. A sealing plate formed in the same shape as the opening of the battery case is placed on the opening, and a safety vent which opens by the pressure of gas generated in the battery case and works as an explosion preventing mechanism is joined by welding to the sealing plate. Welding is performed along the interface between the opening of the battery case and the sealing plate to unify the sealing plate with the battery case so as to seal the inside of the battery case.

Some conventional batteries, including the prismatic batteries, generally include a discharge mechanism for discharging gas to the outside of the battery when the internal pressure rises rapidly by a large amount of gas generated from the electrode plate assembly. Such discharge mechanism includes a safety vent formed with a V-shaped or C-shaped notch or thin portion in the sealing plate that divides the inside and outside of the battery.

Such a safety vent may not always be included, in which case the V-shaped or C-shaped notch or thin portion is formed directly in the sealing plate. When gas is generated inside the battery and the internal pressure of the battery has reached a predetermined level, this notch or thin portion will let out gas to the outside of the battery.

[Patent Document 1] Japanese Patent Publication No. 2001-043845

Prismatic batteries, however, need to have a small discharge mechanism, because of the difficulty in forming a large discharge mechanism. Therefore, unless the notch or thin portion is formed with high processing precision, gas inside the battery cannot be discharged to the outside at a predetermined pressure level, and because of the difficulty in vent control, expensive processing devices and cumbersome processes are required, which was causing a cost increase.

The patent document 1 shows a prismatic battery provided with a weak welding part, such as the joints connecting the short side edges of the opening of a square tubular container and the sealing plate, where the welding strength is lower than other welding parts, but stable control of pressure at which the vent should open is still difficult because of the difficulty in controlling the weld bead width and weld penetration.

Accordingly, the present invention aims at resolving the above problems, and object of the present invention is to provide a battery that makes easy the control of a discharge bent without requiring expensive equipment or many processing steps.

DISCLOSURE OF THE INVENTION

To achieve the above object, the battery according to the present invention is a generally oval battery including a battery case having a generally oval cross section, a generally oval sealing plate, and an electrode plate assembly, the sealing plate having a U-shaped cross section, and the battery having a thickness of 4 mm or more and an aspect ratio of 3 or more.

With this structure, it is not necessary to perform a machining process to form a notch or a thin portion in the battery to provide a discharge mechanism, nor is it necessary to perform a high precision machining for the production of a discharge vent, whereby the battery is provided with a low-cost discharge mechanism that allows easy control of the pressure at which the vent should open.

BEST MODE FOR CARRYING OUT THE INVENTION

Figure 1:
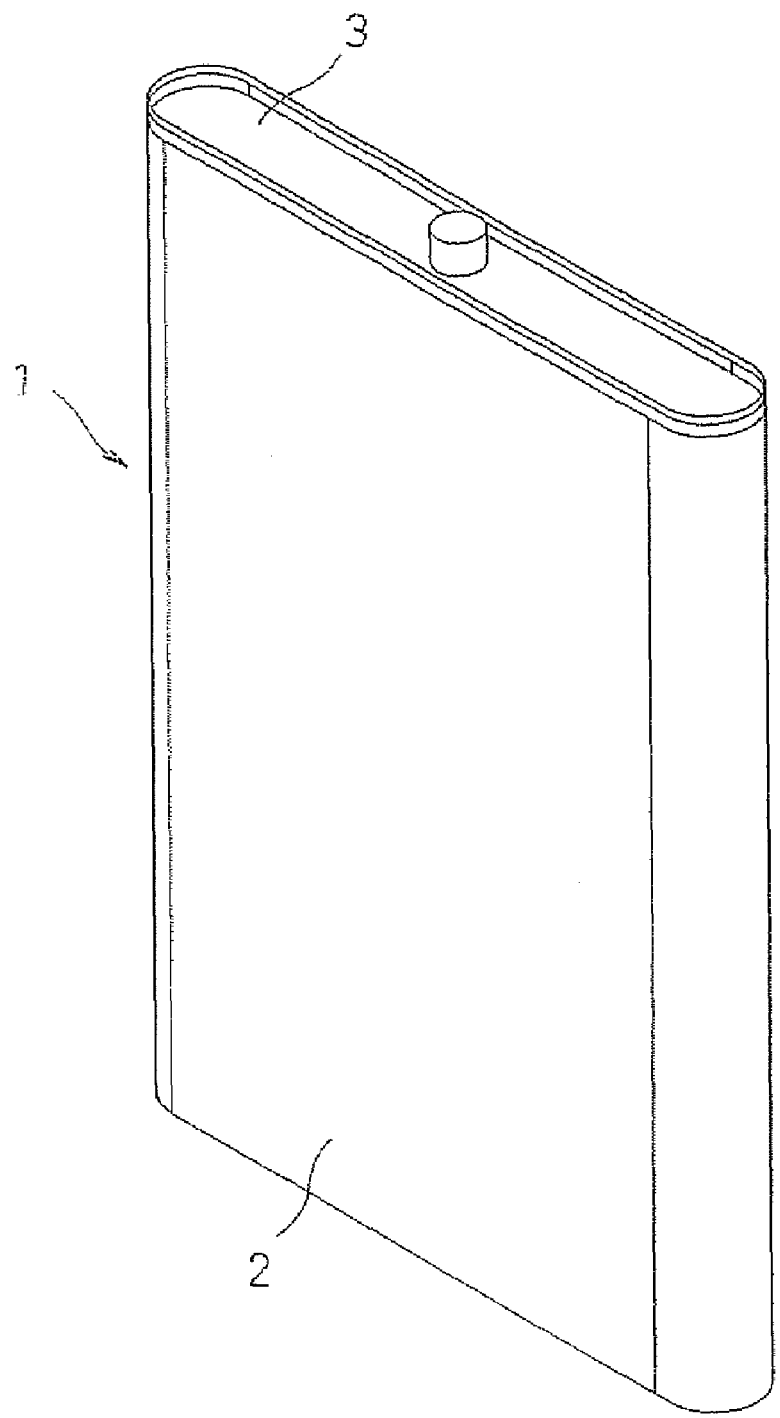
FIG. 1 is a perspective view of the battery of one embodiment.

The present invention provides a generally oval battery 1 including a battery case 2 having a generally oval cross section, a generally oval sealing plate 3, and an electrode plate assembly, as shown in FIG. 1. The sealing plate 3 has a U-shaped cross section, and the battery 1 has a thickness of 4 mm or more and an aspect ratio of 3 or more. With a simple discharge mechanism, the battery achieves the effect of safe gas discharge. Note, the aspect ratio is represented by W/T, W being the battery width (mm) and T being the battery thickness (mm).

Also according to the present invention, the battery case 2 is tubular with open ends and manufactured with ease and at low cost, and because of the ease of producing battery cases 2 of a given length, batteries of a given capacity are readily producible.

Further, using the tubular battery case 2, a U-shaped sealing plate 3 is provided only to one open end, or the pressure at which the vent should open is set lower at one open end than the other open end, so that the weld will break from an intersecting point between a circular part and a linear part selectively at one open end. The discharge mechanism is thus provided in a desired location.

Here, the battery of the present invention includes a battery case 2 having an oval cross section, an electrode plate assembly consisting of positive and negative electrodes and a separator accommodated in the battery case 2, and a sealing plate 3 having a U-shaped cross section and the same oval shape as the opening of the battery case, the battery being sealed by a welding process performed along the interface between the opening of the battery case 2 and the sealing plate 3.

Figure 2:
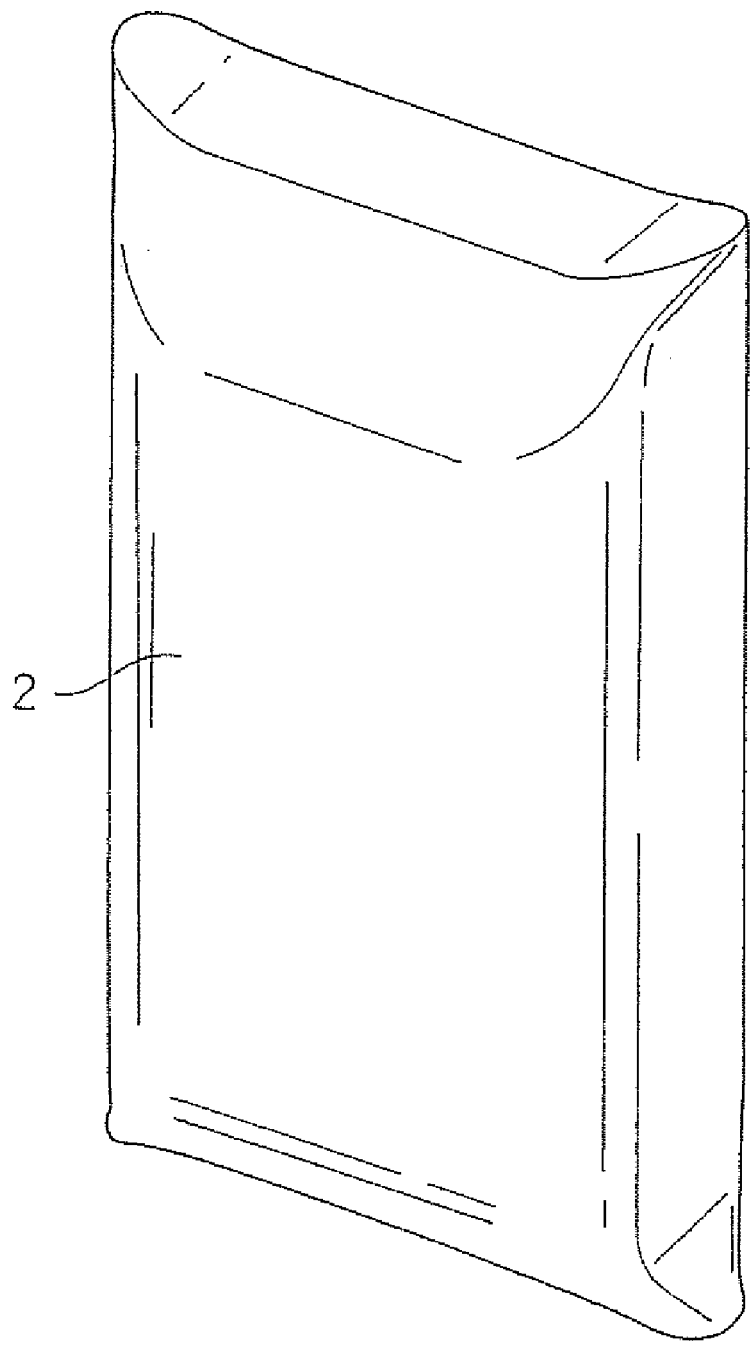
FIG. 2 is a perspective view illustrating a state of the battery when its internal pressure is high.

The inventors of the present invention have found out that, when the internal pressure in the battery case rises and the generally oval battery 1 is deformed into a shape shown in FIG. 2, the battery case 2 and the sealing plate 3 are deformed in different manners because of the correlation between the aspect ratio of the generally oval battery 1 and the battery thickness T. Using this deformation of the battery case 2 and the sealing plate 3, the weld is made to break from an intersecting point between a circular part and a linear part, whereby a battery is obtained which easily lets out gas to the outside, without requiring expensive equipment or many processing steps.

In the present invention, the welding methods include laser welding, spot welding, and other commonly known welding techniques.

Example 1

Hereinafter, a specific embodiment of the present invention will be described.

Figure 3:
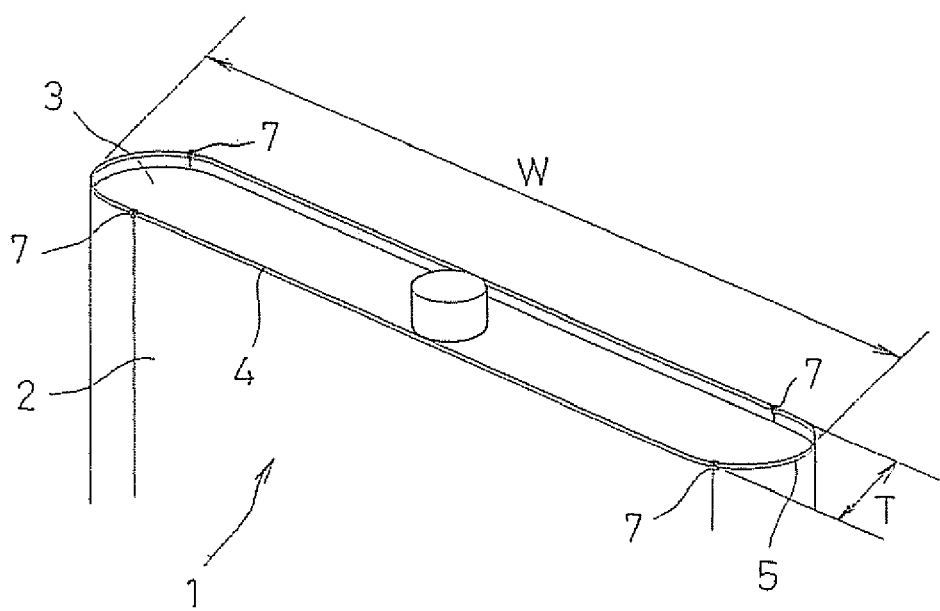
FIG. 3 is a perspective view of the sealing part of the battery.

In the present invention, the generally oval battery 1 shown in FIG. 3 breaks from an intersecting point 7 between a circular part 5 and a linear part 4 using deformation of the battery case 2 and the sealing plate 3 to let out gas. The battery case 2 and the sealing plate 3 deform in different manners depending on the battery thickness T (mm) and the aspect ratio (W/T) which is obtained from the battery width W (mm) and the battery thickness T (mm), and the following tests were carried out. For the battery case 2 and the sealing plate 3, aluminum was used.

Figure 7:
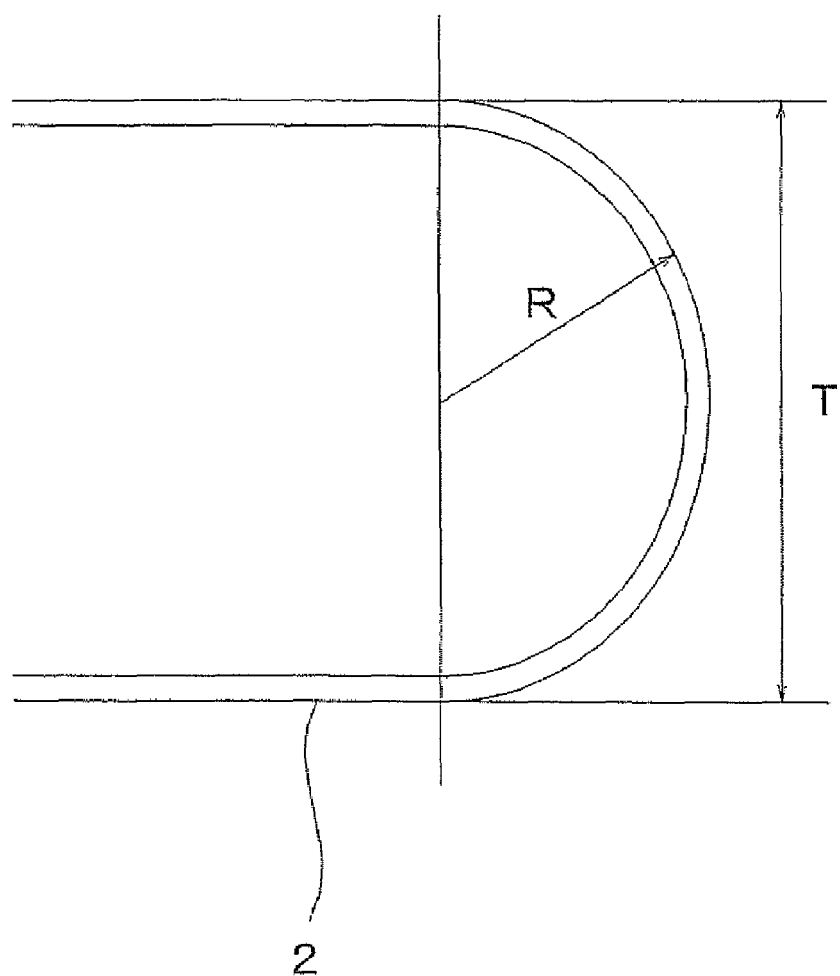
FIG. 7 is a diagram illustrating the radius of curvature R of the battery.

The radius of curvature R of the circular parts 5 of the battery 1 is, as indicated in FIG. 7, the distance from the center of a line that connects both ends of the circular part to the circumference of the circle; in the drawing, 2 R=T.

In this embodiment, the sealing plate 3 was welded to the battery case 2 to seal the battery and the pressure inside the battery was raised, in order to investigate whether the battery would constantly break from the intersecting point 7 between the circular part 5 and linear part 4 irrespective of the size, i.e., whether stable vent control was achieved or not. Measurements in this embodiment were made with a pressure at which the vent should open being 3 kgf/cm². Table 1 to Table 5 show the relationships between the battery thickness T, battery width W, radius of curvature R, and aspect ratio W/T.

Table 6 shows the gas discharge test results. "O" and "X" in Table 6 respectively indicate whether the discharge vent opened constantly at a predetermined pressure or not.

TABLE 1

| Battery Thickness T (mm) | 4 | 5 | 10 | 20 | 30 |
|---|---|---|---|---|---|
| Battery Width W (mm) | 8 | 10 | 20 | 40 | 60 |
| Radius of Curvature R (mm) | 2 | 2.5 | 5 | 10 | 15 |
| Aspect Ratio (W/T) | 2 | 2 | 2 | 2 | 2 |

TABLE 2

| Battery Thickness T (mm) | 4 | 5 | 10 | 20 | 30 |
|---|---|---|---|---|---|
| Battery Width W (mm) | 12 | 15 | 30 | 60 | 90 |
| Radius of Curvature R (mm) | 2 | 2.5 | 5 | 10 | 15 |
| Aspect Ratio (W/T) | 3 | 3 | 3 | 3 | 3 |

TABLE 3

| Battery Thickness T (mm) | 4 | 5 | 10 | 20 | 30 |
|---|---|---|---|---|---|
| Battery Width W (mm) | 16 | 20 | 40 | 80 | 120 |

TABLE 3-continued

| Radius of Curvature R (mm) | 2 | 2.5 | 5 | 10 | 15 |
|---|---|---|---|---|---|
| Aspect Ratio (W/T) | 4 | 4 | 4 | 4 | 4 |

TABLE 4

| Battery Thickness T (mm) | 4 | 5 | 10 | 20 | 30 |
|---|---|---|---|---|---|
| Battery Width W (mm) | 24 | 30 | 60 | 120 | 180 |
| Radius of Curvature R (mm) | 2 | 2.5 | 5 | 10 | 15 |
| Aspect Ratio (W/T) | 6 | 6 | 6 | 6 | 6 |

TABLE 5

| Battery Thickness T (mm) | 4 | 5 | 10 | 20 | 30 |
|---|---|---|---|---|---|
| Battery Width W (mm) | 32 | 40 | 80 | 160 | 240 |
| Radius of Curvature R (mm) | 2 | 2.5 | 5 | 10 | 15 |
| Aspect Ratio (W/T) | 8 | 8 | 8 | 8 | 8 |

TABLE 6

| | | Battery Thickness T (mm) | | | | |
|---|---|---|---|---|---|---|
| | | 4 | 5 | 10 | 20 | 30 |
| Aspect Ratio (W/T) | 2 | X | X | X | X | X |
| | 3 | O | O | O | O | O |
| | 4 | O | O | O | O | O |
| | 6 | O | O | O | O | O |
| | 8 | O | O | O | O | O |

These results show that, by making the battery thickness 4 mm or more and the aspect ratio 3 or more, the battery will constantly break from the intersecting point 7 between the circular part 5 and the linear part 4.

The vent of the batteries indicated with "X" in Table 6 failed to open from the intersecting point 7 between the linear part 4 and the circular part 5, and there was no regularity in the part where the battery broke open. This irregularity in the breaking part is considered to have caused the vent to open at varying pressure.

How the discharge mechanism operates is described in further detail hereinafter.

Figure 4:
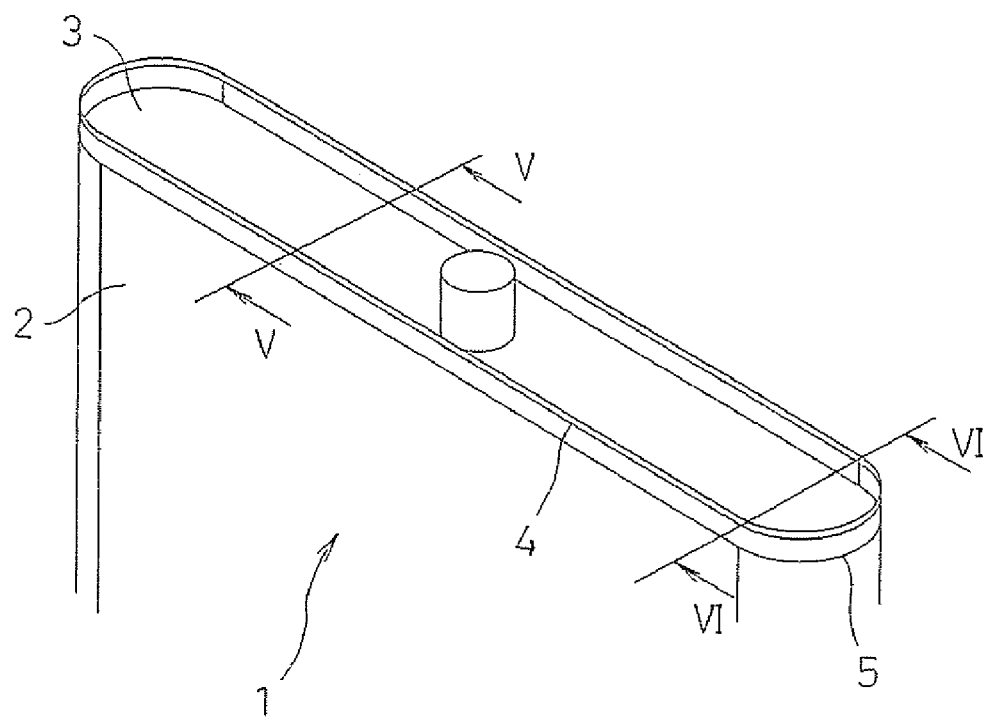
FIG. 4 is a perspective view indicating the points in the linear part and the circular part at which cross sections are taken, in order to examine the operating states of the discharge mechanism of the battery.

FIG. 4 shows the sealing part of the battery of the present invention and indicates the points at which the battery is cut in a direction of the battery thickness T in the linear part 4 and the circular part 5, respectively. As indicated in FIG. 4, the battery is cut along a sectional plane V-V in the linear part 4, and along a sectional plane VI-VI in the circular part 5.

Figure 5A:
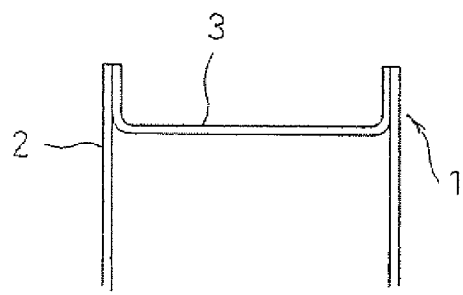
FIG. 5A is a cross-sectional view illustrating the linear part of the battery before deformation and FIG. 5B is a cross-sectional view illustrating the linear part of the battery after deformation.
Figure 5B:
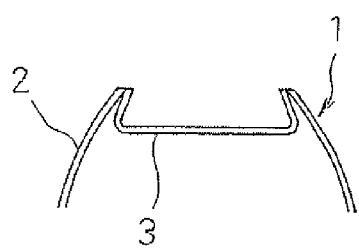

FIG. 5A and FIG. 5B illustrate the shapes before and after deformation of the battery case 2 and the sealing plate 3 in the linear part 4, respectively. When the internal pressure in the battery case rises, the center of the battery case 2 swells. Next, as the center of the battery case swells, the opening of the battery case 2 (joint between the battery case 2 and the sealing plate 3) is pulled toward the center of the battery case 2. As the center of the battery case 2 further swells and the battery thickness increases, the linear part of the sealing plate 3 deforms towards the inside of the battery.

Figure 6A:
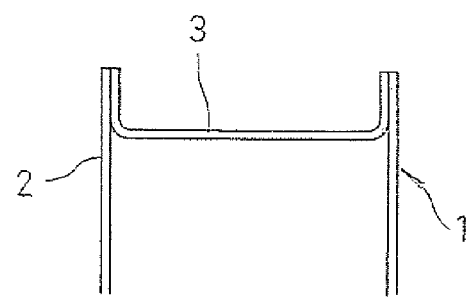
FIG. 6A is a cross-sectional view illustrating the circular part of the battery before deformation and FIG. 6B is a cross-sectional view illustrating the circular part of the battery after deformation.
Figure 6B:
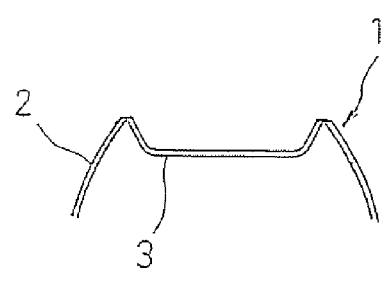

In contrast, the circular part 5 deforms in a different manner from that of the linear part 4. More specifically, as shown in FIG. 6A and FIG. 6B which respectively show the shapes before and after deformation, when the internal pressure in the battery case 2 rises, the center of the battery case 2 swells. Next, as the center of the battery case swells, the opening of the battery case 2 is pulled toward the center of the battery case 2. Here, while the circular part is subjected to a force acting to cause the circular part to deform toward the inside of the battery as with the above-described linear part, the circular part does not deform because of a force that acts to suppress deformation. When the center of the battery case 2 further swells, the force acting to cause deformation toward the inside of the battery is overcome by the force that acts to cause deformation in the opposite direction, whereby the circular part of the sealing plate 3 is stretched open.

Because of such difference in the manner of deformation, the intersecting point between the linear part and the circular part is subjected to shear stress, and therefore the joint surface between the battery case 2 and the sealing plate 3 breaks from this intersecting point, whereby the gas that has built up inside the battery case 2 is discharged to the outside.

While the test was conducted with a pressure at which the vent should open being applied at a rate of 3 $kgf/cm^2$, same effects will be achieved if the pressure is 20 $kgf/cm^2$ or lower (preferably 10 $kgf/cm^2$ or lower). The pressure rate should be appropriately determined depending on various welding conditions for welding the battery case and the sealing plate (e.g., the amount of laser energy or the like, in the case with laser welding).

While aluminum was used for the material of the battery case and the sealing plate in this embodiment, same effects will be achieved with iron or other metal materials.

Figure 8:
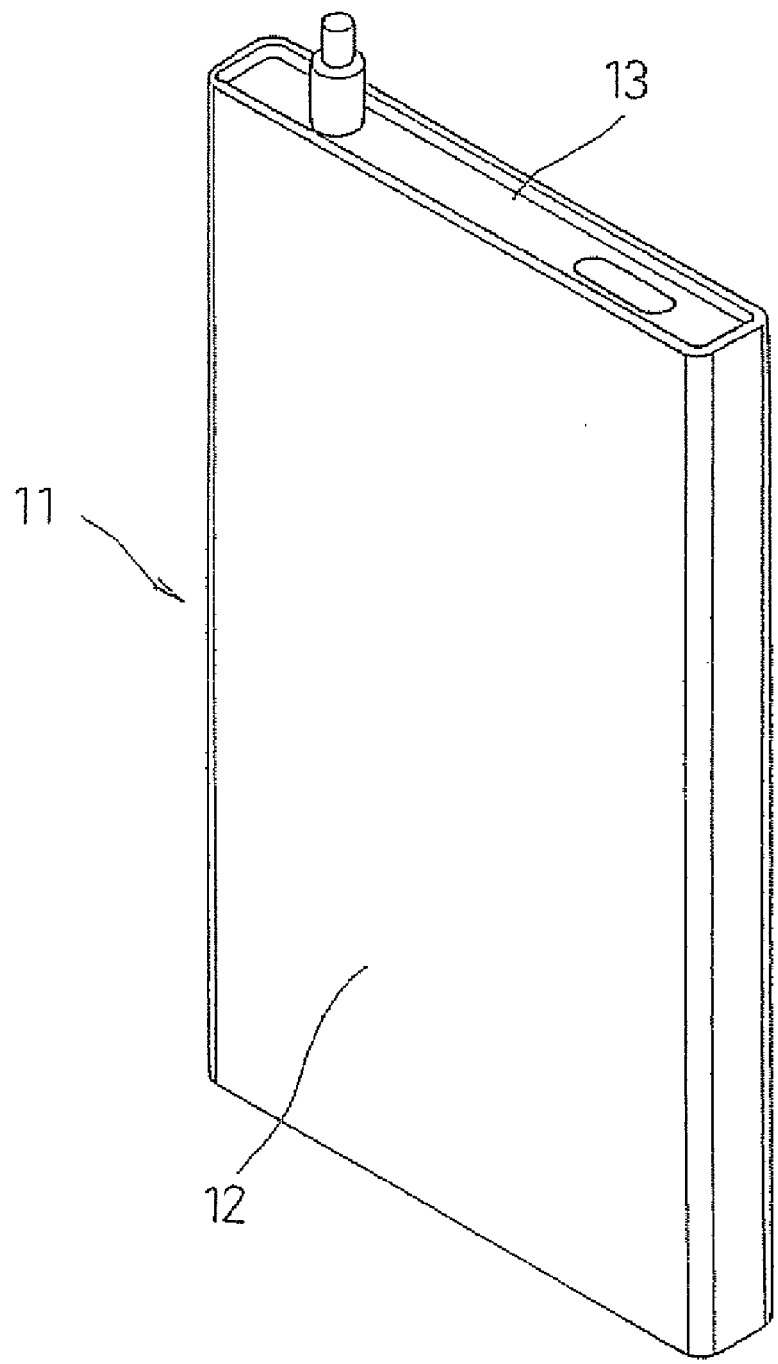
FIG. 8 is a perspective view of a conventional prismatic battery that was tested for comparison with the present embodiment.

As a comparative example, similar tests were conducted with a prismatic battery 11 using a flat square tubular battery case 12 formed in a flat square shape as shown in FIG. 8. Based on the test results using the oval tubular container, batteries with a thickness of 5 mm and 30 mm and an aspect ratio of 3, 4, 6, and 8 were used for stable breakage of the battery case 12 and the sealing plate 13, and the gas discharge results are shown in Table 7. The "-" marks indicate that no tests were conducted.

TABLE 7

|  |  | Battery Thickness T (mm) | | | | |
| --- | --- | --- | --- | --- | --- | --- |
|  |  | 4 | 5 | 10 | 20 | 30 |
| Aspect Ratio (W/T) | 2 | — | — | — | — | — |
|  | 3 | — | X | — | — | X |
|  | 4 | — | X | — | — | X |
|  | 6 | — | X | — | — | X |
|  | 8 | — | X | — | — | X |

Table 7 indicates that, with prismatic batteries 11 formed into a flat square shape, favorable effects was not achieved even when the batteries had the same battery thickness T and aspect ratio W/T as the oval-shaped batteries, with which the discharge vent opened at a predetermined pressure level.

The reason could be because of the following: In the prismatic battery 11 having a flat square shape, the deformation, as in the oval-shaped batteries, was not observed because of the four corners of the flat square tubular battery case 12, and therefore the explosion preventing mechanism did not work in a favorable manner.

INDUSTRIAL APPLICABILITY

As described above, the battery explosion preventing mechanism of the present invention is provided much more simply than a mechanism that consists of a thin portion or a notch, and since a necessary explosion preventing mechanism is provided to the battery without requiring time-consuming or cumbersome processes or using expensive precision machining devices, the invention is useful in reducing processing and equipment costs of the battery.

The invention claimed is:

1. A generally oval battery including a battery case having a generally oval cross section, a generally oval sealing plate including a pair of linear parts opposite each other and a pair of circular parts opposite each other forming a generally oval shape and forming four locations where the linear parts join the circular parts and the shape of the sealing plate changes from a circular part to a linear part and from a linear part to a circular part, and an electrode plate assembly, said sealing plate having a U-shaped cross section, and said battery having a thickness of 4 mm or more and an aspect ratio of 3 or more, wherein the four locations where the shape of the battery case changes from a circular part to a linear part or from a linear part to a circular part in an interface between said battery case and the sealing plate act as points where breakage occurs for discharge of gas.

2. The generally oval battery according to claim 1, wherein said battery case is tubular with open ends.

3. The generally oval battery according to claim 1, wherein said battery case and said sealing plate are joined together by welding.

4. The generally oval battery according to claim 2, wherein said battery case and said sealing plate are joined together by welding.

* * * * *